US006236012B1

(12) United States Patent
Carre et al.

(10) Patent No.: US 6,236,012 B1

(45) Date of Patent: May 22, 2001

(54) PLASMA TORCH WITH AN ADJUSTABLE INJECTOR AND GAS ANALYZER USING SUCH A TORCH

(75) Inventors: Martine Carre, Versailles; Eric Coffre, Trappes; Christian Trassy, Saint-Martin D'Heres, all of (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/221,163

(22) Filed: Dec. 28, 1998

(30) Foreign Application Priority Data

Dec. 29, 1997 (FR) ..................................... 97 16619
Dec. 29, 1997 (FR) ..................................... 97 16620

(51) Int. Cl.[7] ..................................... B23K 9/00

(52) U.S. Cl. ................ 219/121.52; 356/316; 219/121.59

(58) Field of Search ............................ 219/121.52, 121.5, 219/121.59; 356/316; 250/281; 315/111.51

(56) References Cited

U.S. PATENT DOCUMENTS

| | | | |
|---|---|---|---|
| 4,482,246 | * 11/1984 | Meyer et al. | 356/316 |
| 4,766,287 | 8/1988 | Morrisroe et al. | 219/121.52 |
| 5,051,557 | * 9/1991 | Satzger | 219/121.52 |
| 5,223,711 | * 6/1993 | Sanderson et al. | 250/281 |
| 5,233,156 | * 8/1993 | Chan et al. | 219/121.52 |
| 5,908,566 | * 6/1999 | Seltzer | 219/121.52 |

FOREIGN PATENT DOCUMENTS

| | | | |
|---|---|---|---|
| 0 263 031 | 4/1988 | (EP) | G01N/21/73 |
| 0 296 921 | 12/1988 | (EP) | H05H/1/30 |
| 0 358 212 | 3/1990 | (EP) | H01J/49/04 |
| 0 397 468 | 11/1990 | (EP) | H05H/1/30 |

OTHER PUBLICATIONS

Patent Abstracts of Japan, vol. 13, No. 1 (P–808), Jan. 6, 1989 & JP 63 210754 A (Shimadzu Corp) Sep. 1, 1988.

Trassy et al., "Dosage des éléments métalliques dans les gaz. Etude d'une méthode directe" Journal of High Temperature Chemical Processes, No. 2, Dec. 1993, pp. 439–447, XP–002076765.

Patent Abstracts of Japan, vol. 10, No. 57 (P–434) Mar. 7, 1986 & JP 60 201239 A (Shimazu Seisakusho KK) Oct. 11, 1985.

Patent Abstracts of Japan, vol. 17, No. 596 (P–1636), Oct. 29, 1993 & JP 05 180772 A (NKK Corp) Jul. 23, 1993.

Patent Abstracts of Japan, vol. 9, No. 044 (P–337), Feb. 23, 1985, & JP 59 182345 A (Shimazu Seisakusho KK)), Oct. 17, 1984.

* cited by examiner

*Primary Examiner*—Teresa Walberg
*Assistant Examiner*—Quang Van
(74) *Attorney, Agent, or Firm*—Burns, Doane, Swecker & Mathis, L.L.P.

(57) ABSTRACT

This plasma torch (10) for the excitation of a gas for the purpose of analyzing it comprises a tubular injector (12), intended to be connected to a source for supplying a gas to be analyzed, and an external cylindrical sleeve (14) coaxial with the injector (12) and defining a cylindrical annular channel (32) for supplying a plasma gas, intended to be connected to a corresponding supply source for the purpose of generating a plasma (P). The diameter of the injector (12) can vary.

19 Claims, 4 Drawing Sheets

PLASMA TORCH WITH AN ADJUSTABLE INJECTOR AND GAS ANALYZER USING SUCH A TORCH

BACKGROUND OF THE INVENTION (i) Field of the Invention

The present invention relates to a plasma torch intended for the excitation of a gas for the purpose of analyzing it.

The invention also relates to a gas analyzer using such a plasma torch.

(ii) Description of Related Art

Currently, gas analysis techniques are indirect techniques, such as filtration, hydrolysis or sparging, in which the impurities, the concentration of which is to be determined, are extracted from the gas before analysis.

Thus, for example, the filtration analysis technique uses a membrane for filtering the gas to be analyzed for the purpose of retaining the impurities that it contains. Next, these impurities are dissolved in an acid solution and then analyzed, for example by spectroscopy, for the purpose of determining the nature and concentration thereof.

These conventional analytical techniques have a number of drawbacks.

First of all, because of their nature and particularly because there is a step of extracting the particles to be analyzed, these techniques are not suitable for the quality of a gas to be analyzed continuously.

Furthermore, they give relatively inaccurate results since these techniques only allow an average concentration value corresponding to the total amount of the sample to be obtained. They therefore do not allow instantaneous variations in the concentrations to be detected.

In addition, some impurity particles are likely to be in the form of volatile compounds which cannot be extracted from the gas using such techniques. The result obtained is thus likely to be underestimated.

Finally, these techniques entail a not insignificant risk of contaminating the gas and require relatively complex equipment.

It has been attempted to remedy these drawbacks by using a direct gas analysis technique.

According to this technique, a gas sample to be analyzed is introduced into a heat source, such as a plasma, capable of dissociating the chemical species present in the sample into free atoms and then of exciting and optionally ionizing the atoms obtained. Next, these excited atoms are detected by measuring the various wavelengths that they emit or, if they are ionized, by measuring their mass.

Although this technique allows a gas to be analyzed continuously it also has a number of drawbacks, especially because of the gas recirculation movements produced by the action of Lorentz forces near the inductor used for generating the plasma.

These recirculation movements will force the gas to the periphery of the plasma and cause the decomposition products to be deposited on the torch and therefore cause undesirable contamination of the latter, impeding optical detection, as well as modifying the energy transfer between the induction coil and the plasma.

Moreover, the gas flowing in this peripheral region undergoes less excitation, thereby helping to reduce the accuracy of the measurement.

The studies completed by the Applicant on this subject have moreover demonstrated that, depending on the nature of the gas to be analyzed (for example, depending on whether or not it is a diatomic gas), there is a major risk of the plasma being blown out when introducing the gas to be analyzed into this plasma.

SUMMARY AND OBJECTS OF THE INVENTION

The object of the invention is to overcome the aforementioned drawbacks.

The subject of the invention is therefore particularly a plasma torch for the excitation of a gas for the purpose of analyzing it, comprising an injector, configured in the form of a main tube intended to be connected to a source for supplying a gas to be analyzed, and an external cylindrical sleeve which is double walled, coaxial with the injector and defining, between its consecutive internal and external walls, a cylindrical annular channel for supplying a plasma gas, intended to be connected to a corresponding supply source for the purpose of generating a plasma at the outlet of the sleeve, being characterized in that the diameter of the injector can vary.

The plasma torch according to the invention may furthermore include one or more of the following characteristics:

- the diameter of the injector can vary, taking at least two values, by adopting the following configuration: the injector is formed from at least two coaxial tubes, one internal and the other external, the internal tube being capable of sliding vertically inside the external tube;
- according to one of the embodiments of the invention, the diameter of the injection tube lies in the range going from 0.8 to 3 mm;
- according to one of the embodiments of the invention, the diameter of the injection tube lies in the range going from 1.3 to 2 mm;
- the injector includes an additional outer tube coaxial with the main tube and defining two coaxial channels, an internal and an external coaxial channel, one of these being intended for supplying the torch with a gas to be analyzed and the other being intended to supply the torch with a gas for guiding the said gas to be analyzed in the plasma, respectively;
- the plasma gas and/or the guiding gas comprise argon or helium or any other gas capable of creating a plasma, or a mixture of such gases;
- the external wall of the sleeve forms the external wall of the torch;
- the torch includes a coil placed near the end face of the external wall of the torch and connected to a high-frequency current source for the purpose of creating, in the path of the plasma gas, an electromagnetic field and of creating the plasma in the gas;
- the torch furthermore includes an intermediate cylindrical tube coaxial with the sleeve and lying inside the sleeve, between its internal wall and its external wall, the intermediate cylindrical tube and the external wall of the sleeve defining a channel for supplying a gas for shielding the internal surface of the external wall of the torch from solid deposits;
- the channel for supplying a shielding gas forms a channel for supplying a gas containing a chemical compound suitable for reacting with the solid deposits liable to be formed on the external wall of the torch in order to form a volatile compound.

The subject of the invention is also a gas analyzer, characterized in that it comprises a plasma torch as defined above, connected to a source for supplying a gas to be analyzed to a source for supplying a plasma gas and, advantageously, also to a source of gas for guiding the gas to be analyzed in the plasma generated at the outlet of the torch in the plasma gas, and optical detection means which are capable of measuring the light intensity emitted by the impurities present in the plasma and are connected to a processing unit which includes means for calculating the concentration of impurities from the measured value of the light intensity and from at least one predetermined reference value which is stored in a memory associated with the processing unit and is obtained by prior calibration.

According to one particular characteristic, the analyzer includes a unit for the production of standard specimens, comprising:

- a source of solutions of dissolved salts of one or more elements;
- a nebulizing unit;
- a solvent-stripping unit;

one outlet of the production unit being connected to the channel for supplying the torch with a gas to be analyzed.

Further features and advantages will emerge from the following description, given by way of example, and with reference to the appended drawings:

BRIEF DESCRIPTION OF THE DRAWINGS

FIG. 2 shows a partial axial sectional view of an injector with a diameter which can be varied according to the invention by using two concentric tubes, the internal tube of which is able to slide vertically in the external tube of which;

DETAILED DESCRIPTION OF THE PREFERRED EMBODIMENTS

Figure 1:
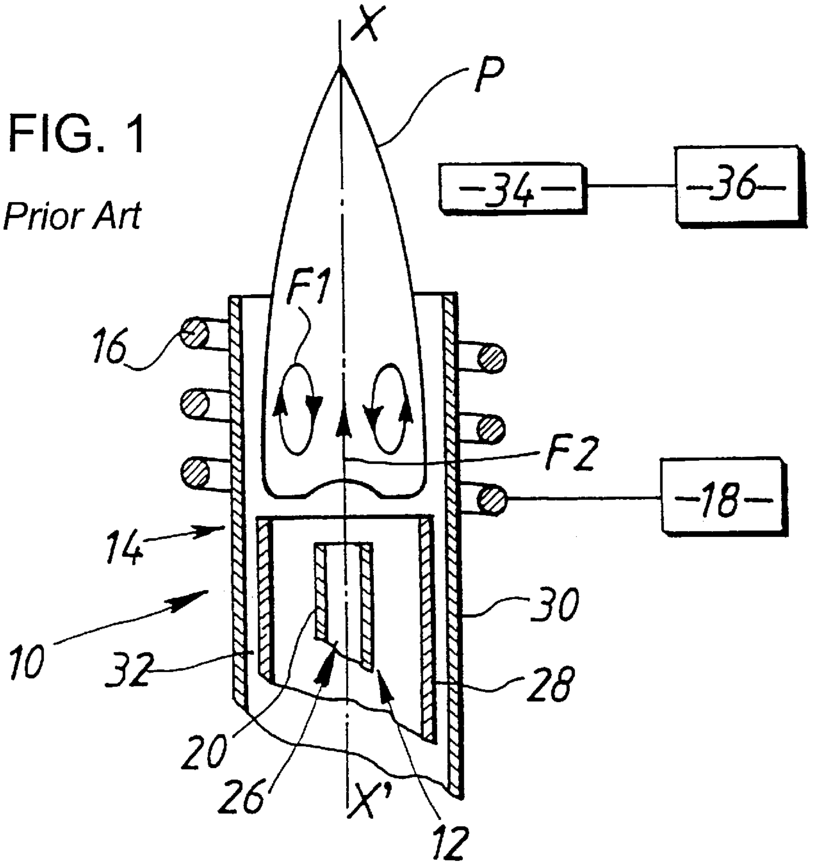
FIG. 1 Prior Art
FIG. 1 shows a diagrammatic axial sectional view of a plasma torch according to the prior art.

Shown in FIG. 1 is a plasma torch intended to dissociate the chemical species of a gas comprising impurities, in order to generate free atoms and to excite the atoms thus obtained for the purpose of determining the concentration of impurities.

For example, the gas to be analyzed consists of a gas used in the field of semiconductor fabrication, such as a halide or a fluorinated gas, and the impurities consist of metallic elements such as nickel, iron, manganese, etc.

FIG. 1 shows that the plasma torch, denoted by the general numerical reference 10, comprises: a central injector 12 configured in the form of a tube, an external cylindrical sleeve 14 which is double walled (28/30), and a coil 16 connected to a high-frequency current source 18.

The wall 20 of the injector defines, internally, a channel 26 intended to be connected to a source for supplying the torch 10 with a gas to be analyzed (the source is not shown in this figure).

It may therefore be seen in FIG. 1 that the sleeve 14 has an internal wall 28 and an external wall 30 which extends beyond the free end of the internal wall 28. These walls are made of a material suitable for the envisaged use, i.e. capable of withstanding high temperatures, for example fused silica.

The internal and external walls of the sleeve 14 between them define a cylindrical annular channel 32 connected, in operation, to a source for supplying a plasma gas, for example argon, for the purpose of generating a plasma at the outlet of the sleeve.

The consecutive external wall 30 of the sleeve forms the external wall of the torch 10 and is equipped, near its end face, with the coil 16. As mentioned previously, the latter is connected to a conventional high-frequency current source capable of supplying the coil with a current at a frequency of between 5 MHz and 100 MHz.

Due to the action of the current source 18, the coil generates, as is conventional, an electromagnetic field which decreases radially towards the axis X–X' of the torch 10.

The plasma gas, supplied via the annular channel 32, at a flow rate of 20 liters/minute for example, is sent into a region in which the electromagnetic field has approximately its maximum value. This field creates a plasma in the plasma gas by accelerating its charged particles.

As mentioned previously, and as shown by the arrow F1 in FIG. 1, the plasma undergoes recirculation movements due to the effect of the Lorentz forces applied to the charged particles. Due to the effect of these forces, the velocity of the gas is negative in the axial region, that is to say the particles move in a direction towards the upstream of the torch, with respect to the gas flow direction, this movement being counter to the introduction of the gas to be analyzed.

Moreover, in a region shifted radially with respect to the axis X–X', these forces tend to send the gas to be analyzed to the peripheral region.

As may be seen in FIG. 1, the gas to be analyzed is introduced into the internal supply channel 26 in the direction shown by the arrow F2 in the axial region, at a flow rate usually of the order of a few ml/minute to a few hundred ml/minute.

Finally, it will be seen in FIG. 1 that a photoelectric detector 34 is connected to a processing unit 36 which calculates the concentration of impurities in the gas from the value of the wavelength of the radiation emitted by the particles of excited impurities, as will be described in detail below.

Figure 2:
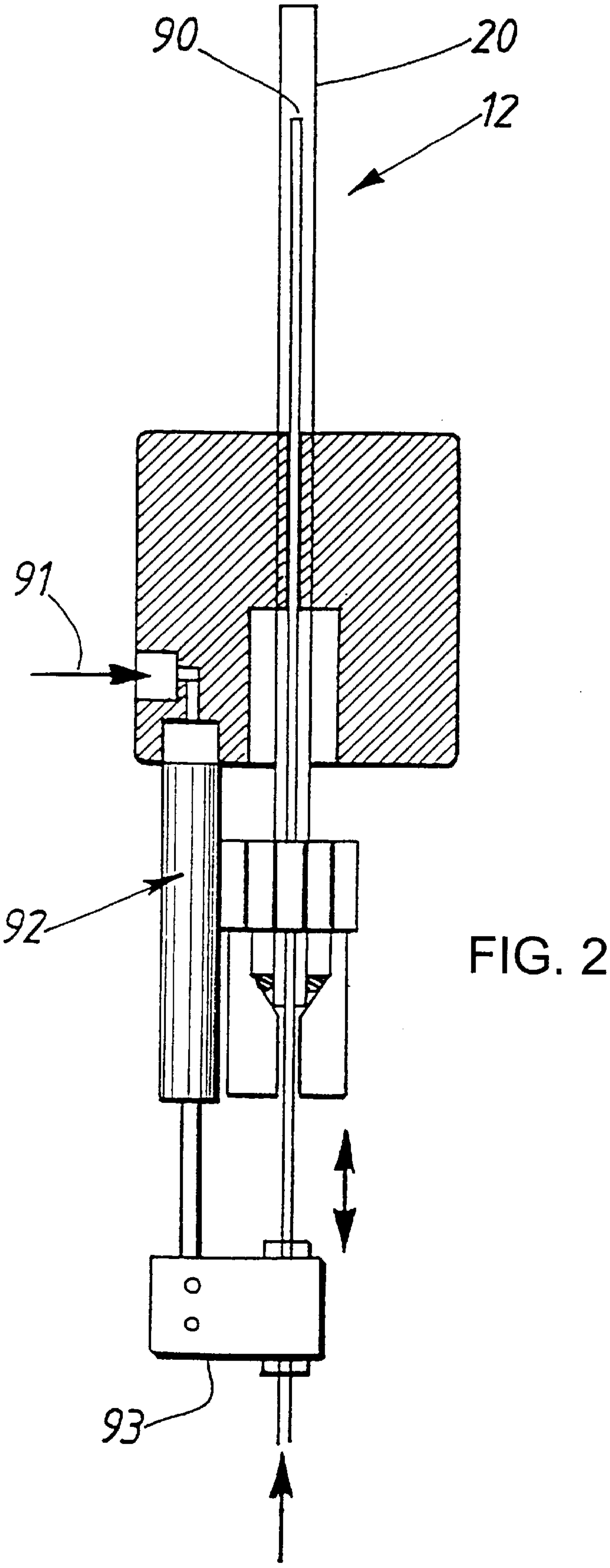

Shown in FIG. 2 is one embodiment of a variable-diameter injector according to the invention.

The injector 12 here is formed from two coaxial tubes, namely the external tube (20) and the internal tube (90), the internal tube 90 being able to slide vertically inside the external tube.

In the case of the embodiment shown here, this sliding effect is obtained by means of a pneumatic actuation 91, which acts on a microcylinder 92.

It will also be noted in this figure that there is an attachment piece 93 which is fastened to the rod of the microcylinder and to the internal tube 90.

This internal tube, driven by the microcylinder by the mechanism which has just been described, may therefore slide vertically inside the external tube 20.

It may therefore be imagined that, according to this embodiment, the injector can adopt two configurations:

- a high position of the internal tube 90, the upper end of which is then forced back level with the upper end of the external tube. The gas to be analyzed is injected and then enters the plasma via the "small" diameter of the internal tube of the injector;

a low position of the internal tube 90 (an example of such a low position is shown in FIG. 2), the upper end of which is then positioned below the upper end of the external tube. The gas to be analyzed is injected and then enters the plasma via the "large" diameter of the external tube of the injector.

The amount by which the upper end of the internal tube is lowered with respect to the upper end of the external tube may typically be of the order of magnitude of 1 to 2 cm.

As will be clearly apparent to those skilled in the art, the injector shown here is an injector consisting of two coaxial tubes 20 and 90, allowing the diameter of the injection point to be varied between two values, but it may be imagined that, without in any way departing from the scope of the present invention, the injector may have a structure consisting of several coaxial tubes (more than 2) allowing, depending on the sliding clearance of the tubes inside the outermost tube, the diameter of the injection point to be varied over several possible values.

Figure 3:
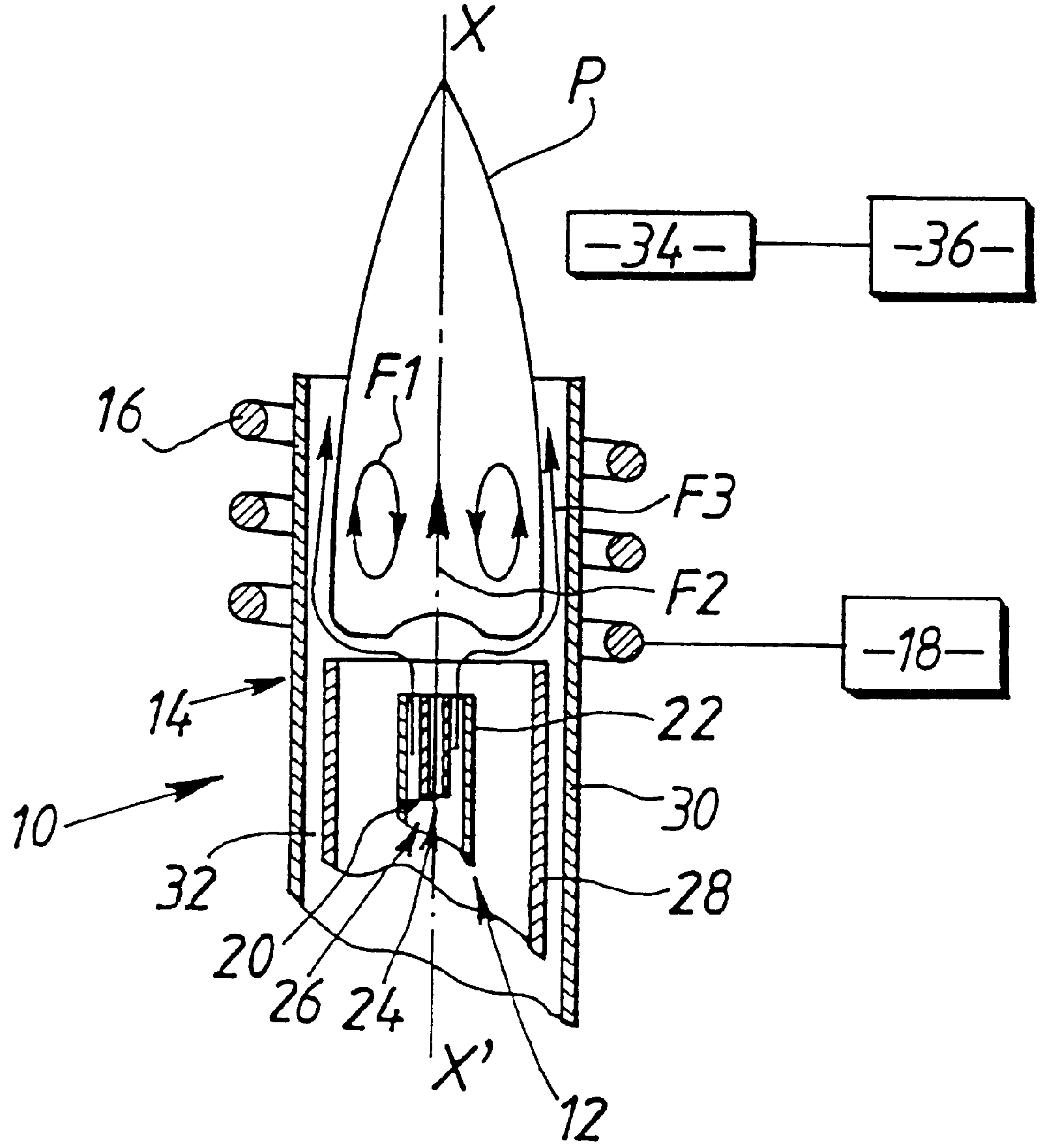
FIG. 3 shows an axial sectional view of a plasma torch according to the invention, the injector of which allows the use of a gas for guiding the gas to be analyzed in the plasma.

Shown in FIG. 3 is another embodiment of the plasma torch according to the invention.

It will be noted that, in the case of the embodiment shown in FIG. 3, the torch here includes a somewhat special central injector 12 which comprises, according to one of the advantageous embodiments of the invention mentioned above, an additional outer tube 22, coaxial with the main tube 20 and thus delimiting two coaxial channels, an internal and an external coaxial channel, one of these being intended for supplying the torch with the gas to be analyzed and the other being intended for supplying the torch with a gas for guiding the said gas to be analyzed in the plasma, respectively.

The studies completed by the Applicant have in fact demonstrated that such a configuration is advantageous in order to deliver the gas to be analyzed inside the tube internal to the wall 20, while a "guiding" gas is delivered into the intermediate annular space between the additional wall 22 and the main tube 20 of the injector.

The guiding gas is delivered at a flow rate of, for example, the order of a few hundred ml/minute and therefore guides the gas to be analyzed in the plasma P. This guiding action thus counters the action of the Lorentz forces on the gas to be analyzed, thus helping to prevent the gas to be analyzed from being deflected (i.e. so as to ensure that the entire sample reaches the plasma).

Furthermore, and as shown by the arrows F3, since the guiding gas, the composition of which is completely controlled, is forced to the periphery of the torch instead of the gas to be analyzed, particles forming part of the composition of the gas to be analyzed are thus prevented from being deposited on the external wall 30 by choosing the guiding gas appropriately. Advantageously, the guiding gas comprises helium or argon or a mixture of such gases.

It will be understood that, in the case of the invention, the injection of a guiding gas inside the injector is optional.

Advantageously, it is possible to inject into the gap between the sleeve 28/30 and the injector of the torch, a stream of argon so as to shift the proximal end of the plasma P from the end face of the sleeve.

As will be clearly apparent to those skilled in the art, this figure shows a double-walled tubular injector allowing injection of the gas to be analyzed and of a gas for guiding the gas to be analyzed in the plasma.

However, for the sake of legibility of the figure, which, as one can see, is relatively cluttered, a means of varying the diameter of injection of the gas to be analyzed according to the invention has not been shown here.

Thus, a single injection tube 20 for the gas to be analyzed has been shown without, for example, showing the presence of an internal tube 90 coaxial to the external tube 20 and able to slide inside this external tube 20 (the embodiment in FIG. 2) since it will be imagined that such an illustration would have excessively burdened this FIG. 3.

A gas analyzer will now be described with reference to FIG. 4.

This figure shows that the analyzer, shown diagrammatically, comprises a plasma torch 54 according to the invention, for example one similar to the torch described in the context of FIGS. 1 and 2, associated with a high-frequency current generator 56 and a photodetector 58 which itself is connected to a processing unit 60.

This figure shows that the external cylindrical sleeve of the torch 54 is supplied with argon (Ar) in order to create a plasma, preferably at atmospheric pressure or at a slightly reduced pressure.

Moreover, the injector 62, since it has to allow introduction of the gas to be analysed into the plasma, is connected to a first mixer 64, comprising a first inlet 66 supplied with inert gas, such as argon, and making it possible to increase the rate of entrainment of the gas to be analyzed, and a second inlet 68 connected to the outlet of a second mixer 70.

This second mixer has a first inlet 72 supplied with the gas G to be analyzed and a second inlet 74 connected to the outlet of a unit 75 for the production of standard samples, which unit comprises:

a source 80 of solutions of dissolved salts of one or more elements;

a nebulizing unit 78;

a solvent-stripping unit 76;

one outlet of the unit 75 being connected to the channel for supplying the torch with the gas to be analyzed.

The unit 76 has an inlet allowing aerosols coming from the unit 78 to enter.

The unit 78 has, moreover, a gas inlet 86 allowing an inert gas such as argon to enter.

In order to calibrate the analyzer, the elements to be assayed, at a known concentration and in a given (liquid, solid or gaseous) form which is as close to that of the elements to be determined, are introduced into the specimens of gas G. Thus, in a gas the polluting elements may be in solid or gaseous form, and more rarely in liquid form. However, it is known that solid particles, often present in chemical gases, have a size of less than one micron. With such a size, these particles are rapidly volatilized and generate in an argon plasma a light intensity identical to that: generated by gaseous compounds.

Thus, by way of illustration, in order to calibrate the analyzer in terms of a given metallic element, an aerosol, typically comprising water vapor, solvents and the particles in question, is generated from a solution 80 of a salt of the metallic impurity in question by means of the nebulizing unit 78.

The inflow of gas 86 (for example argon) transports this aerosol to the solvent-stripping unit.

There then follows a solvent-stripping operation in the unit 76, consisting in heating the aerosol gas in order to evaporate and condense the water and the possible solvent or solvents (these being removed from the unit 76 via an outlet 82), thus making it possible to recover a gas which transports the initially introduced and now dried or substantially dried particles, with a controlled content depending in particular on the concentration of the particles in the sample 80.

For greater details regarding the production of samples of metallic particles by nebulization/solvent-stripping, the reader may refer to the following documents: C. Hélou, "Analyse de traces d'eléments dans les gaz par spectroscopie d'émission utilisant un plasma HF [*Analysis of trace elements in gases by emission spectroscopy using an HF plasma*]", PhD Thesis, Claude Bernard University, Lyons, France, 1981, or else to the publication in the names of C. Trassy et al., in the journal High Temperature Chemical Processes, Vol. 2, 439–447, (1993).

The standard samples thus created are forced into the plasma P by a gas similar to the gas G, but without any impurity, or else by argon.

The light intensity emitted by the impurities is detected by the photodetector 58 (a monochromator and/or a polychromator) and then stored in a memory 84 of the analyzing unit 60.

After having calibrated the analyzer, the gas G is sent into the mixer 70 and injected into the plasma P.

The light intensity emitted by the impurities in the gas G is then sent into the analyzing unit 60.

This analyzing unit has conventional computing means for comparing the detected light intensity of the impurities to be assayed with the reference values obtained beforehand and stored in the memory 84.

The precise concentration of particles contained in the gas G is thus, for example, obtained by identification of the sample, the corresponding signal of which has a wavelength and an intensity that are identical to the values measured from the gas G.

Figure 5:
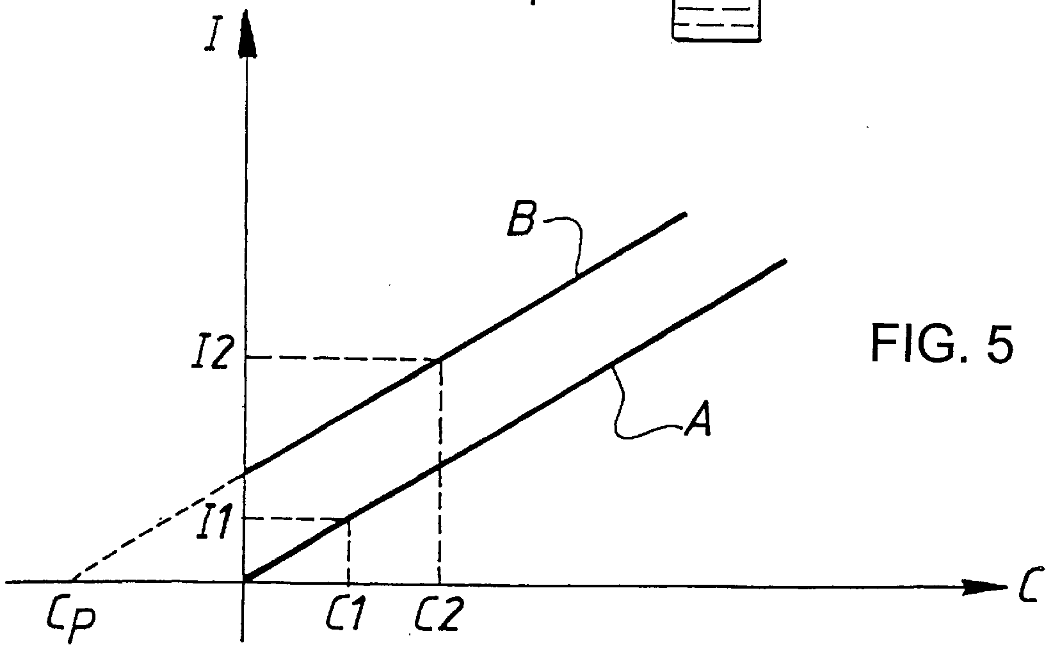
FIG. 5 shows curves illustrating the variation in the light intensity of the particles as a function of their concentration.

As is well known to those skilled in the art, (the so-called method of "metered additions"), it is also possible, as a variant, to determine the concentration C of particles in the gas G from the calculation of the function connecting the light intensity I of the particles in the plasma to the concentration of particles C in the latter (FIG. 5).

It is known in fact that, for a gas devoid of a given type of particle, i.e. the concentration of which is zero, the light intensity at the corresponding wavelength is zero. It is thus possible to determine the slope of curve A connecting the intensity I with the concentration C from a single measurement of the light intensity I1 emitted by a pure gas mixed with a specimen of concentration C1.

Moreover, it is known that, for identical plasma conditions, particularly for the same plasma temperature, the slope of curve B, obtained from a gas, connecting the intensity I with the concentration C of impurities is identical to that of curve A obtained from the same gas in the pure state.

Thus, in order to assay the gas G to be analyzed, which has an unknown concentration $C_p$ of particles, all that is required is to add to this gas particles with a known concentration C2 which are taken from a sample 80 and to measure the corresponding intensity I2. The value of the concentration $C_p$ is thus obtained by extrapolating curve B using the computing means of the analyzing unit 60.

Figure 4:
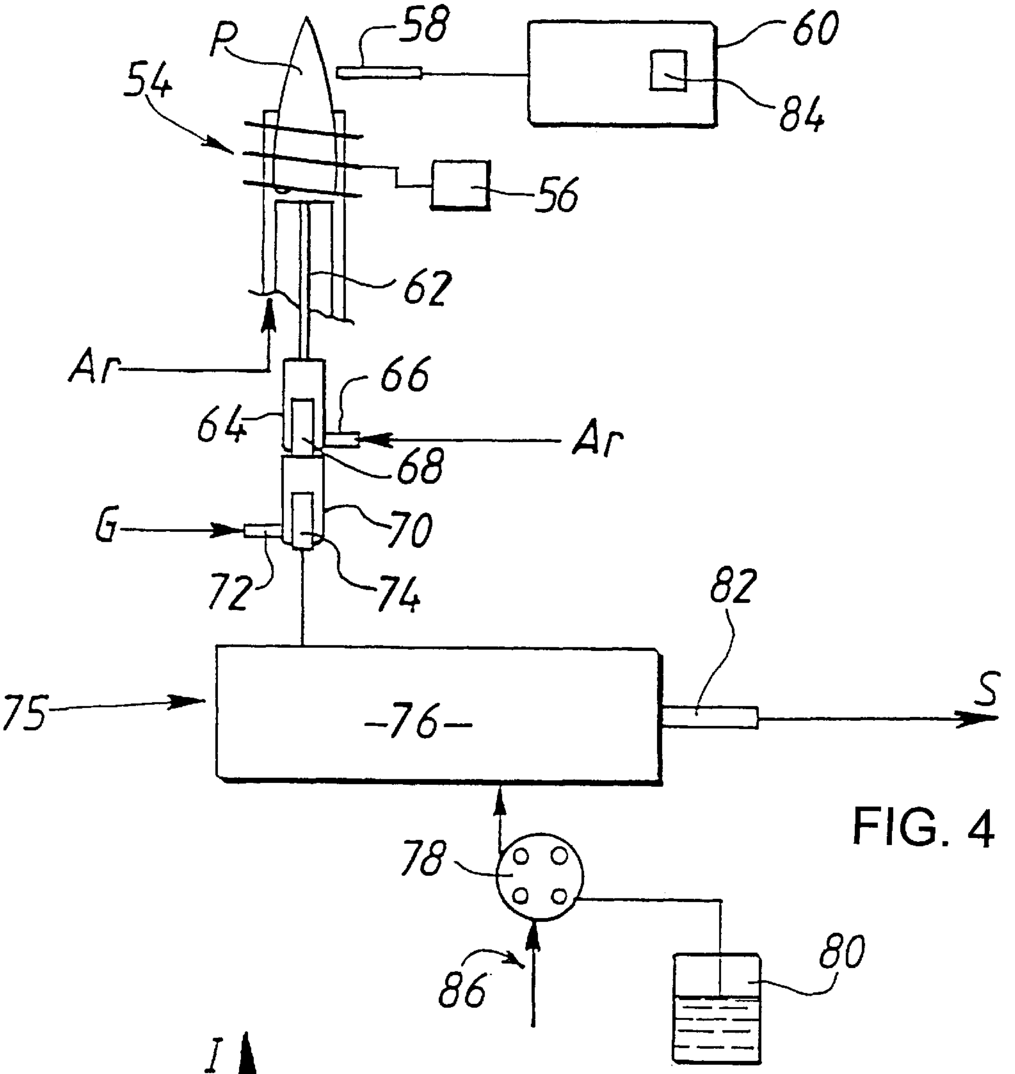
FIG. 4 is a diagrammatic view of a gas analyzer according to the invention.

The studies completed by the Applicant using an analyzer as described in the context of FIG. 4, both in cases of analyzing metallic impurities in gases to be analyzed which were inert gases, such as argon, or alternatively helium or nitrogen, and in cases of analyzing metallic impurities in triatomic gases or gases containing more than three atoms, it is possible to demonstrate that it is advantageous, in the case of gases to be analyzed which are monoatomic or diatomic, to use an injection tube diameter lying within a range going from 0.8 to 2 mm and preferably from 1.3 to 1.7 mm, whereas, for gases to be analyzed which are triatomic or which contain more than three atoms (such as silane or alternatively ammonia), an injection tube diameter lying within the range going from 1 to 3 mm, but preferably from 1.8 to 2.3 mm should be employed.

It will be understood that these diameter ranges are given by way of indication, taking into account the overall geometry of the system and of the operating frequencies used for the experiments, they should be adapted if these parameters were to be modified.

Figure 6:
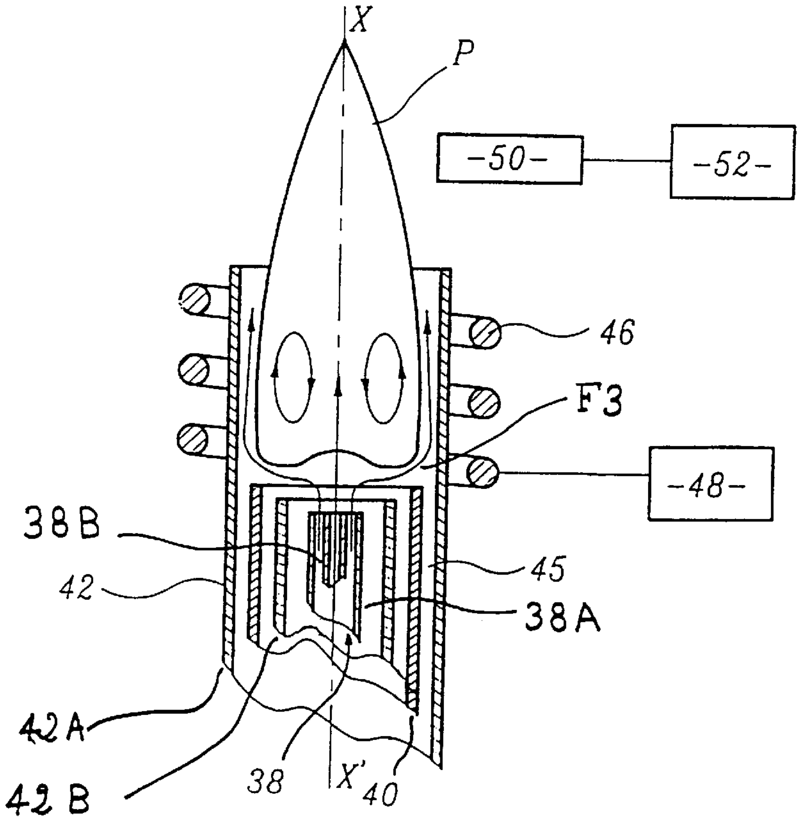
FIG. 6 shows a diagrammatic axial sectional view of a plasma torch according to the invention, which incorporates within the sleeve an intermediate tube allowing the use of a shielding gas.

Finally, and in a less detailed manner, FIG. 6 shows a diagrammatic axial sectional view of a plasma torch according to the invention, incorporating an intermediate tube within the sleeve.

The torch shown in FIG. 6 has, in fact, an intermediate tube 40, coaxial with the sleeve 42, lying between the external and internal walls of the sleeve (42A and 42B), the intermediate tube 40 and the external wall 42A of the sleeve defining a channel 45 for supplying a gas for shielding the external wall (42A) of the torch against solid deposits.

Furthermore, the torch shown in FIG. 6 is provided with a coil 46, supplied by a high-frequency current source 48 and placed near the end face of the torch, and with a photodetector 50 connected to a processing unit 52.

For the sake of legibility, the successive gaps 42A/40/42B have been intentionally exaggerated, the tube 40 being in practice very close to the external wall 42A of the torch (the order of magnitude being 1 mm or even 0.1 mm).

The supply channel 45 is therefore connected to a source (not shown) for supplying a shielding gas capable of reacting with the species liable to be deposited on the internal surface of the external wall 42A of the torch in order to form a volatile compound.

Thus, by way of example, if the gas to be analyzed comprises silane ($SiH_4$), the gas used in the semiconductor fabrication field, the shielding gas comprises chlorine, optionally mixed with argon, which reacts with the silicon to form $SiCl_4$. Since the latter compound is a volatile species, any silicon-based deposit is thus avoided.

It should be noted that, in the case of the embodiment shown in FIG. 6, the torch here includes a central injector 38 with a double wall (38A, 38B) for injecting, on the one hand, the gas to be analyzed and, on the other hand, a "guiding" gas.

The structure allowing a guiding gas to be injected into the injector will not be commented on again here.

Here too, advantageously, it is possible to inject a stream of argon into the gap between the sleeve and the injector of the torch shown in FIG. 6 so as to shift the proximal end of the plasma P from the end face of the sleeve.

What is claimed is:

1. A plasma torch comprising an injector comprising a main tube adapted to be connected to a source for supplying a gas to be analyzed, said injector having a variable diameter sizable to provide selected diametrical variation in injection of said gas to be analyzed into said plasma; and an external cylindrical sleeve, including an inlet and an outlet, which is double walled, coaxial with the injector and defining, between its consecutive internal and external walls, a cylindrical annular channel for supplying a plasma gas for generating a plasma (P) at the outlet of said sleeve.

2. The plasma torch according to claim 1, wherein the variable diameter of said injector is formed from at least two coaxial tubes comprising one external tube and at least one other internal tube which slides vertically inside the external tube.

3. A plasma torch comprising an injector having a main tube adapted to be connected to a source for supplying a gas to be analyzed, and an external cylindrical sleeve, including an inlet and an outlet, which is double walled, coaxial with the injector and defining, between its consecutive internal and external walls, a cylindrical annular channel for supplying a plasma gas for generating a plasma (P) at the outlet of said sleeve, said injector having a variable diameter;

wherein the variable diameter of said injector is formed from at least two coaxial tubes comprising one external tube and at least one other internal tube which slides vertically inside the external tube;

said plasma torch further comprising a pneumatic actuation which acts on a microcylinder comprising a rod which is connected to an attachment piece which itself is fastened to said internal tube, such that said at least one internal tube slides inside said external tube.

4. The plasma torch according to claim 1, wherein the diameter of said injector ranges from about 1 to 3 mm.

5. The plasma torch according to claim 1, wherein the diameter of said injector ranges from 0.8 to 2 mm.

6. The plasma torch according to claim 1, wherein said injector further comprises an additional outer tube coaxial with the main tube and defining an internal and an external coaxial channel, one of which supplies the torch with a gas to be analysed and the other of which supplies the torch with a gas for guiding said gas to be analysed in the plasma, respectively.

7. The plasma torch according to claim 1, wherein the external wall of the sleeve forms the external wall of the torch.

8. The plasma torch according to claim 1, wherein said plasma gas comprises at least one of argon and helium.

9. The plasma torch according to claim 1, further comprising an intermediate tube coaxial with said sleeve, lying between an external wall and an internal wall of the sleeve, the intermediate tube and the external wall of the sleeve defining a channel for supplying a gas for shielding the internal surface of the external wall of the sleeve from solid deposits.

10. The plasma torch according to claim 9, wherein said channel for supplying a shielding gas is adapted to supply a gas comprising a chemical compound which reacts with the solid particles liable to be deposited on the external wall of the sleeve in order to form a volatile compound.

11. A gas analyzer comprising:

the plasma torch according to claim 1;

a source for supplying a gas (G) to be analyzed connected to said plasma torch;

a source for supplying a plasma gas connected to said plasma torch; and an optical detector which measures the light intensity (I) emitted by the impurities present in the plasma (P), said detector being connected to a processing unit which includes a processor which calculates the concentration of impurities from the measured value of the light intensity (I) and from at least one predetermined reference value which is stored in a memory associated with said processing unit and is obtained by prior calibration.

12. The analyzer according to claim 11, further comprising a unit for production of standard specimens, comprising:

a source of solutions of dissolved salts of one or more elements;

a nebulizing unit;

a solvent-stripping unit;

wherein one outlet of the production unit is connected to the channel for supplying the torch with a gas to be analysed.

13. The plasma torch according to claim 1, further comprising a supply source which is connected to said cylindrical annular channel.

14. The plasma torch according to claim 1, further comprising an analyzer downstream of said injector.

15. The plasma torch according to claim 4, wherein the diameter of said injector ranges from 1.8 to 2.3 mm.

16. The plasma torch according to claim 5, wherein the diameter of said injector ranges from 1.3 to 1.7 mm.

17. The plasm torch according to claim 6, wherein said guiding gas comprises at least one of argon and helium.

18. The analyzer according to claim 11, further comprising, connected to said plasma torch, a source of gas for guiding the gas (G) to be analysed in the plasma (P) generated at the outlet of the torch in the plasma gas.

19. The plasma torch according to claim 2, further comprising a pneumatic actuation which acts on a microcylinder comprising a rod which is connected to an attachment piece which itself is fastened to said internal tube, such that said at least one internal tube slides inside said external tube.

* * * * *